J. GUSTAFSON.
CLUTCH.
APPLICATION FILED JUNE 1, 1910.

1,026,437.

Patented May 14, 1912.

3 SHEETS—SHEET 1.

WITNESSES
Edward Thorpe.
Walton Harrison

INVENTOR
John Gustafson
BY Munn & Co
ATTORNEYS

J. GUSTAFSON.
CLUTCH.
APPLICATION FILED JUNE 1, 1910.

1,026,437.

Patented May 14, 1912.
3 SHEETS—SHEET 2.

WITNESSES
Edward Thorpe
Walton Harrison

INVENTOR
John Gustafson
BY Munn & Co
ATTORNEYS.

J. GUSTAFSON.
CLUTCH.
APPLICATION FILED JUNE 1, 1910.

1,026,437.

Patented May 14, 1912.
3 SHEETS—SHEET 3.

WITNESSES
Edward Thorpe
Walton Harrison

INVENTOR
John Gustafson
BY Munn & Co
ATTORNEYS.

UNITED STATES PATENT OFFICE.

JOHN GUSTAFSON, OF NEW YORK, N. Y.

CLUTCH.

1,026,437.   Specification of Letters Patent.   Patented May 14, 1912.

Application filed June 1, 1910. Serial No. 564,350.

*To all whom it may concern:*

Be it known that I, JOHN GUSTAFSON, a subject of the King of Sweden, and a resident of the city of New York, borough of Brooklyn, in the county of Kings and State of New York, have invented a new and Improved Clutch, of which the following is a full, clear, and exact description.

My invention relates to clutches, my more particular object being to provide an improved construction of clutch in which the grip is positive and the strength and simplicity of the mechanism greatly promoted.

Reference is to be had to the accompanying drawings forming a part of this specification, in which similar characters of reference indicate corresponding parts in all the views.

Figure 1:
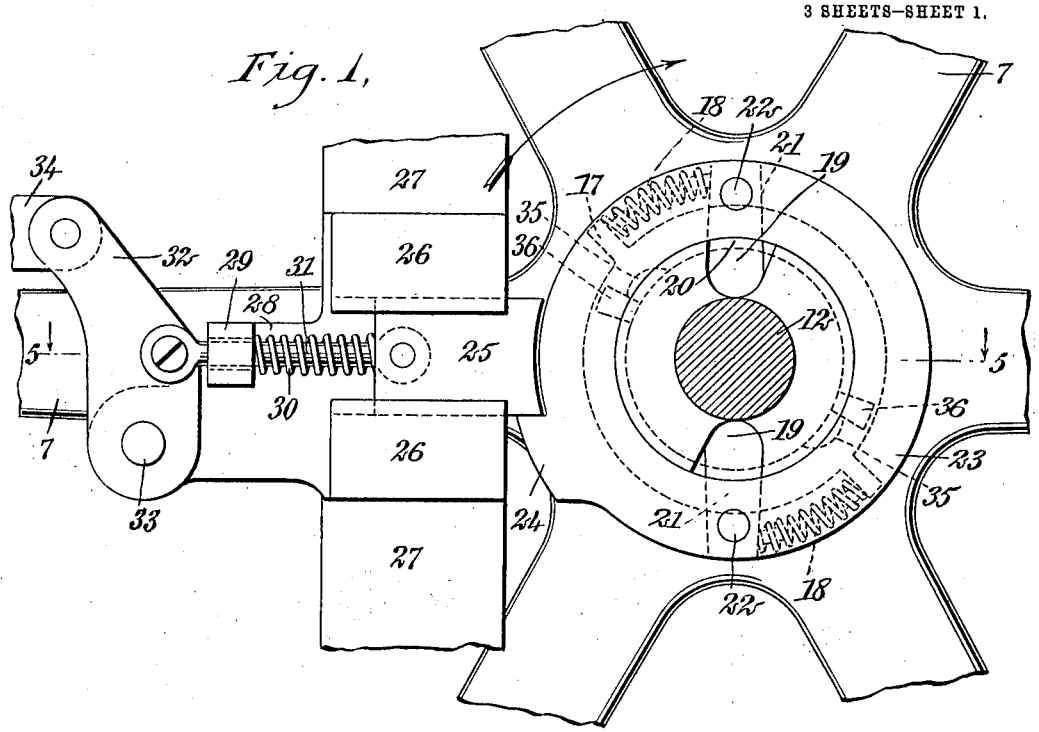
Figure 2:
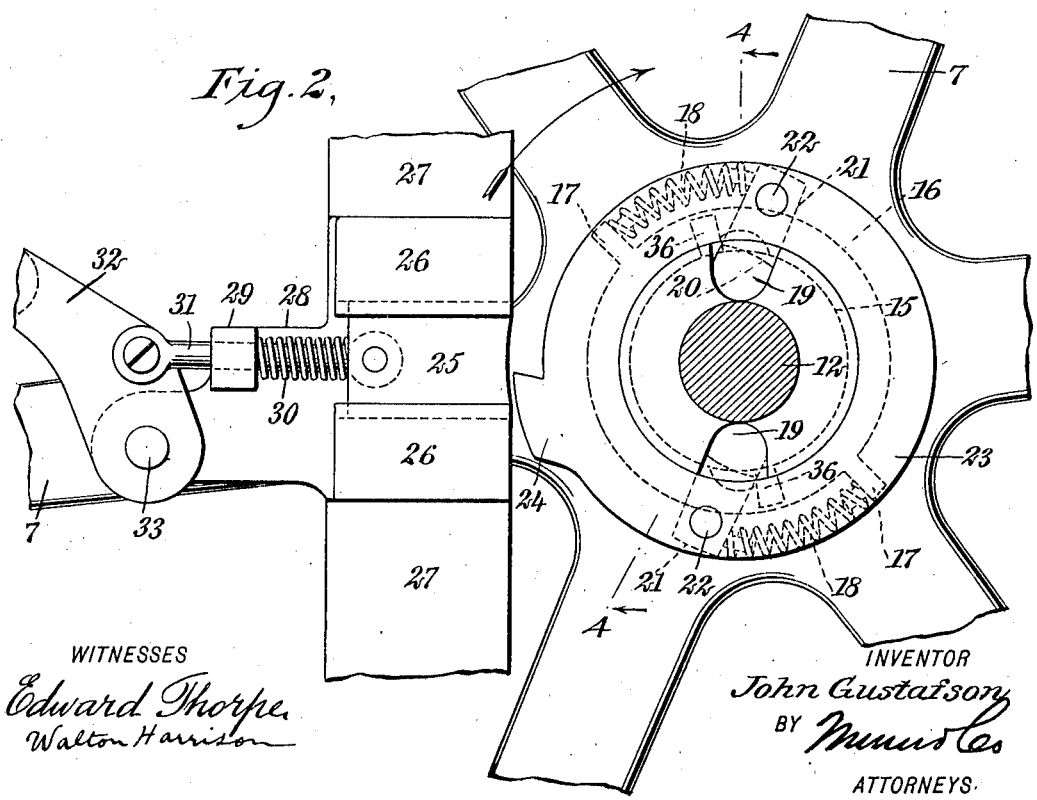
Figure 3:
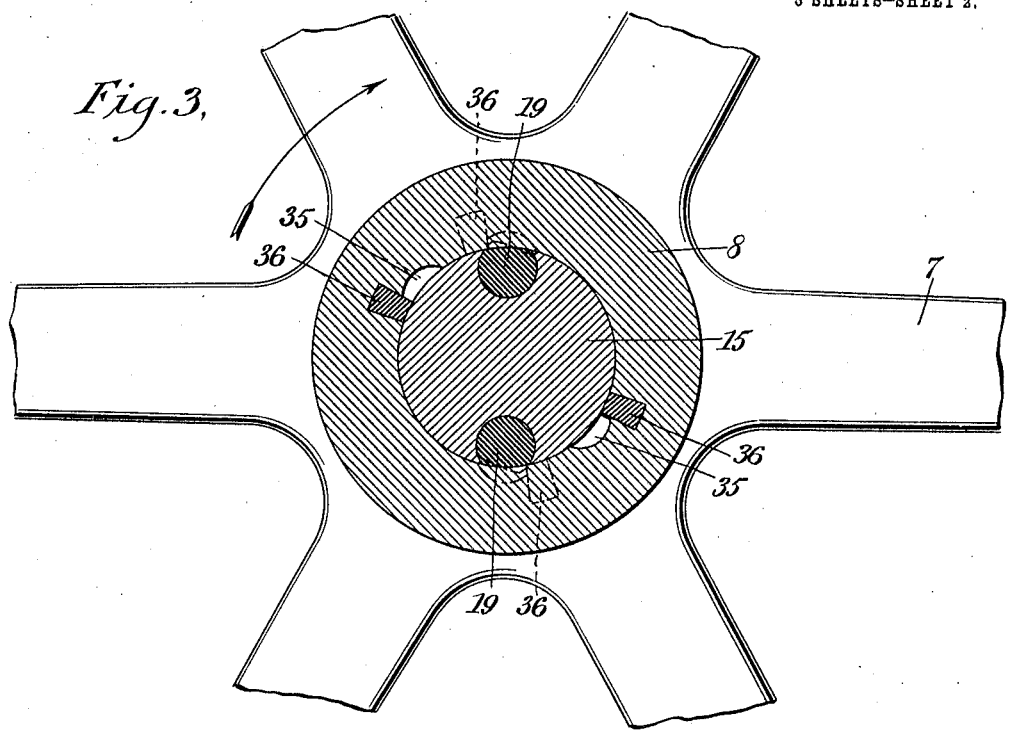
Figure 5:
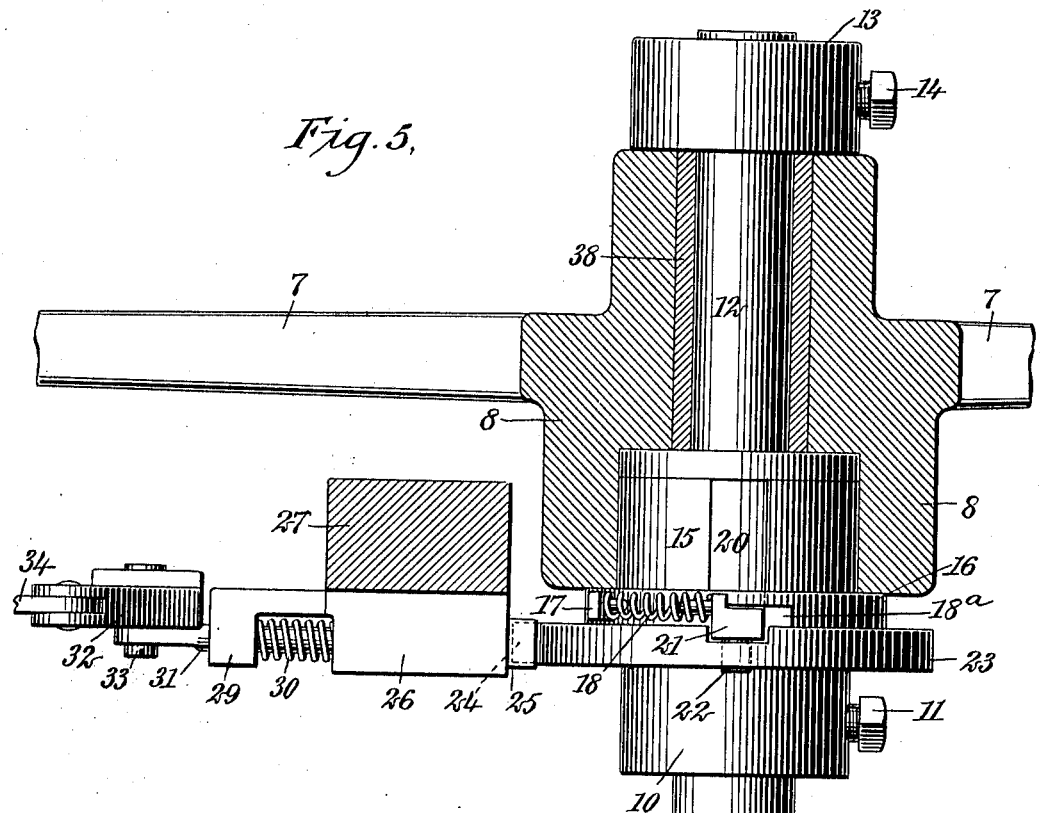
Figure 6:
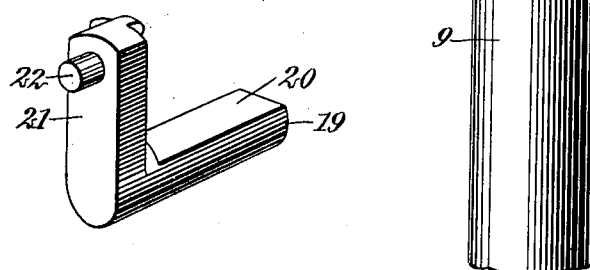

Figure 1 is a vertical section through a revoluble shaft upon which is mounted a wheel hub provided with the gripping mechanism of the clutch, this view further showing a manually-controlled device whereby a revoluble disk is stopped and started in order to actuate the gripping mechanism, the position of the parts in this view being such that the wheel hub is free to turn independently of the shaft; Fig. 2 is a view somewhat similar to Fig. 1, but showing the manually-operated mechanism for controlling the gripping device in such position that the wheel hub is gripped tightly in relation to the shaft, so that rotation of the wheel turns the shaft; Fig. 3 is a vertical section upon the line 3—3 of Fig. 4, looking in the direction of the arrow, and showing the details of the rocking key for gripping together the parts to be locked and for releasing the same, this view also showing details of the wheel hub; Fig. 5 is a substantially horizontal section through the device on the line 5—5 of Fig. 1, this view showing more particularly how the manually-operated mechanism controls the revoluble disk for actuating the gripping mechanism; and Fig. 6 is a perspective view of one of the rocking keys employed.

A wheel 7 is shown fragmentarily and is mounted upon a hub 8, the wheel and hub being normally in motion. A shaft is shown at 9 and is sometimes at rest and sometimes revoluble with the hub. A collar 10 is provided with a set screw 11 and is mounted upon the shaft 9. The shaft is provided with a reduced portion 12 upon which is set a collar 13 by aid of a set screw 14. The shaft 9 is further provided with an enlarged cylindrical portion 15, and also with a flange 16 of greater diameter than said enlarged portion 15. This flange 16 carries a lug 17, and a compression spring 18, of spiral form, engages this lug. The rocking keys are shown at 19 and are each sunken into the cylindrical portion 15. The rocking keys are each provided with a bearing face 20 having the same general curvature as that of the cylindrical portion 15. Each rocking key 19 is also provided with a crank 21, carrying a crank pin 22. The rocking keys 19 are each free to turn slightly, as will be understood by contrasting Figs. 1 and 2. A disk 23 is mounted loosely upon the shaft 12 and is provided with a tooth 24. A slide 25 is mounted between supports 26, the latter together constituting a slideway and being sustained by a stationary frame 27. The slide 25, when moved to the right (see Fig. 1) obstructs the rotation of the disk 23 by stopping the tooth 24. When the slide 25 is to the left (see Fig. 2) the disk 23 is free to rotate.

A bracket 28 is mounted upon the framework 27 and is provided with a bearing 29. A spring 30 engages this bearing and also engages the slide 25. A rod 31 is pivotally connected with the slide 25 and with a lever 32, the latter being journaled upon a pivot pin 33 and adapted to rock. A rod 34 is connected with the lever 32 for the purpose of enabling the latter to be actuated by hand or by aid of a treadle.

The hub 8 is provided with two oppositely disposed recesses 35 (see Fig. 3) of arcuate form, and into these recesses the rocking keys 19 are adapted to project slightly when turned by the cranks 21. This affords a positive lock between the hub 8 and the shaft 9. The hub 8 is also dovetailed and fitted with keys 36 of hard steel or other durable metal, these keys forming boundaries for portions of the recesses 35. The rocking keys 19 are so formed that when in the position indicated by full lines in Fig. 3 they virtually constitute continuations of the shaft's surface 15, or in other words, the shaft may be considered perfectly cylindrical; whereas, when the keys 19 are rocked so that they project into the arcuate recesses 35, the shaft has practically a greater diameter in the general direction represented by the plane of the recesses.

At 37 (see Fig. 4) is a washer, and at 38 is a bearing sleeve, these parts being removable, and when worn out they can be replaced by new parts of similar construction.

Figure 4:
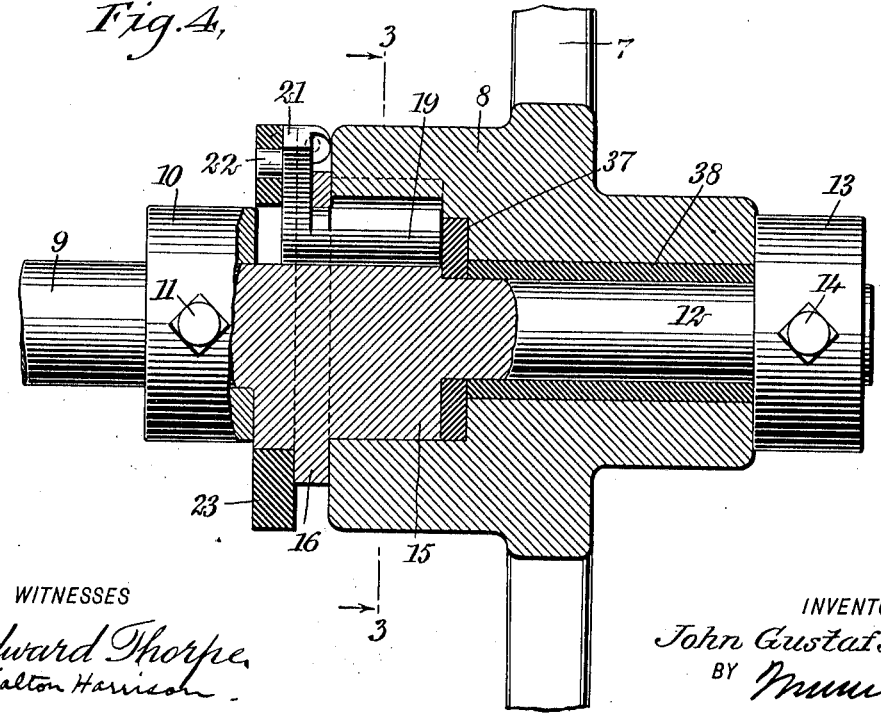

Fig. 4 gives a clear idea of the relative arrangement of the parts, the rocking key 19 with its crank 21 and crank pin 22, being shown in elevation.

The operation of my device is as follows: The revoluble hub 8 being normally in motion, we will assume that the shaft 9 is stationary and that the operator desires the shaft 9 to turn with the hub. The parts now occupy the position indicated in Fig. 1, the disk 23 being stationary for the time. The operator actuates the lever 32, thereby moving the slide 25 to the left, according to Fig. 1. The slide now clears the tooth 24, as will be understood from Fig. 2. The disk 23 being thus released, the springs 18, heretofore under compression, now tend to expand and to assume the position indicated by dotted lines in Fig. 2. In doing this, they necessarily tend to turn the cranks 21 and the rocking keys 19. The keys, however, are not altogether free to turn until in their travel they reach the arcuate recesses 35. Upon reaching these, the keys turn slightly and thus lock the cylindrical portion 15 of the shaft rigidly in relation to the wheel hub 8. The shaft must now rotate with the hub which acts as a driving member. In order to release the shaft, the operator actuates the lever 32 in such manner as to push the slide 25 out partially into the path of the tooth 24, as indicated in Fig. 1. This stops rotation of the disk 23 and causes the springs 18 to become compressed so that the rocking keys 19 assume their normal positions indicated in Fig. 1, thereby causing the hub to release the enlarged cylindrical portion 15 of the shaft. The hub now turns idly, no further motion being communicated to the shaft 9.

Having thus described my invention, I claim as new and desire to secure by Letters Patent:

1. In a clutch, the combination of a normally stationary shaft provided with a longitudinal ungrooved cylindrical portion serving as a bearing, and with a cylindrical portion of large diameter also serving as a bearing, said cylindrical portion of large diameter being provided with pocket grooves, a hub provided with a cylindrical bearing surface encircling said longitudinal cylindrical bearing portion, said hub being further provided with a substantially cylindrical bearing surface of large diameter encircling said large cylindrical portion of said shaft and with recesses interrupting said substantially cylindrical bearing surface, key members pivotally mounted within said pocket grooves and adapted to engage said cylindrical bearing surface of large diameter and also to extend into said recesses, and means controllable at the will of the operator for actuating said key members.

2. In a clutch, the combination of a normally stationary shaft provided with a longitudinal ungrooved cylindrical portion serving as a bearing, said shaft being further provided with a cylindrical portion of large diameter and having a pair of pocket grooves disposed upon diametrically opposite sides of the axis of rotation of said shaft, key members mounted within said pocket grooves, a hub provided with a portion encircling said longitudinal cylindrical portion of said shaft, said hub being further provided with a portion of enlarged diameter encircling said portion of large diameter of said hub and thus encircling said key members, said portion of enlarged diameter of said hub being also provided with recesses into which said key members may project when said key members are turned within their pocket grooves, and mechanism controllable at the will of the operator for turning said key members.

In testimony whereof I have signed my name to this specification in the presence of two subscribing witnesses.

JOHN GUSTAFSON.

Witnesses:
WALTON HARRISON,
PHILIP D. ROLLHAUS.

---

Copies of this patent may be obtained for five cents each, by addressing the "Commissioner of Patents, Washington, D. C."